United States Patent
Weng et al.

(10) Patent No.: US 8,768,293 B1
(45) Date of Patent: Jul. 1, 2014

(54) AUTOMATICALLY ESTABLISHING A TELEPHONIC CONNECTION BETWEEN DEVICES

(75) Inventors: Zhi Dennis Weng, San Jose, CA (US); Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/464,738

(22) Filed: May 4, 2012

Related U.S. Application Data

(60) Provisional application No. 61/484,083, filed on May 9, 2011.

(51) Int. Cl.
*H04M 11/02* (2006.01)

(52) U.S. Cl.
USPC .................. 455/404.2; 455/404.1; 379/210.01

(58) Field of Classification Search
USPC ..................................... 455/404.1; 379/210.01
See application file for complete search history.

(56) References Cited

U.S. PATENT DOCUMENTS

| | | | | |
|---|---|---|---|---|
| 4,481,382 | A | * | 11/1984 | Villa-Real .................. 455/556.1 |
| 5,446,740 | A | * | 8/1995 | Yien et al. ..................... 709/247 |
| 5,559,878 | A | * | 9/1996 | Keys et al. ............... 379/210.01 |
| 2001/0026609 | A1 | * | 10/2001 | Weinstein et al. ......... 379/93.01 |
| 2005/0089149 | A1 | * | 4/2005 | Elias .......................... 379/88.13 |
| 2010/0273443 | A1 | * | 10/2010 | Forutanpour et al. ...... 455/404.1 |

OTHER PUBLICATIONS

"Receiving Calls: Customizing greetings and settings for contacts and contact groups", Google Voice [online]. First Accessed on Jan. 5, 2011. Retrieved from the Internet: <http://support.google.com/voice/bin/answer.py?hl=en&answer=115069> 1 p.

"Optional Voicemail / Messaging Module Services", Lake Communications [online]. First Accessed on Jan. 5, 2011. Retrieved from the Internet: <http://web.archive.org/web/20090327031134/http://www.lakecommunications.com/lake.nsf/documents/OLVMFeatures?opendocument> 3 pp.

"Personal Custom Greetings", YouMail [online]. First Accessed on Jan. 5, 2011. Retrieved from the Internet: <http://www.youmail.com/home/corp/feature.do?name=greetings> 1 p.

* cited by examiner

*Primary Examiner* — Charles Shedrick

(74) *Attorney, Agent, or Firm* — Leydig, Voit & Mayer, Ltd.

(57) ABSTRACT

Various aspects of this disclosure are directed to determining, with a computing device, an amount of time that has elapsed since the computing device was last utilized for processing an outgoing or an incoming phone call. The computing device may determine that the amount of time that has elapsed exceeds a threshold time value. Responsive to the determination, the computing device may identify a phone number to call with the computing device, may establish a voice connection using the identified phone number, and may output a message using the voice connection.

20 Claims, 4 Drawing Sheets

AUTOMATICALLY ESTABLISHING A TELEPHONIC CONNECTION BETWEEN DEVICES

RELATED APPLICATIONS

This application claims the benefit of U.S. provisional application No. 61/484,083, filed May 9, 2011, the entire content of which is incorporated herein by reference.

TECHNICAL FIELD

This disclosure relates to computing devices and, more particularly to, computing devices used for telephonic communication.

BACKGROUND

Computing devices may be used as communication devices, such as for telephonic communications. Conventionally, a device may be configured to dial a preconfigured phone number upon receiving an indication that a user would like to dial the phone number. For example, a user may wear a remote control for the device and, when the user would like the device to call the single preconfigured phone number, the user may press a button on the remote control. In another example, a device may be provided with a list of phone numbers to call and output a predefined message upon the call being answered.

SUMMARY

In one example, various aspects of this disclosure are directed to a method comprising determining, with a computing device, an amount of time that has elapsed since the computing device was last utilized for processing an outgoing or an incoming phone call, determining, with the computing device, that the amount of time that has elapsed exceeds a threshold time value, and responsive to the determination identifying, with the computing device, a phone number to call with the computing device, establishing, with the computing device, a voice connection using the identified phone number, and outputting a message using the voice connection.

In another example, various aspects of this disclosure are directed to a computer-readable storage medium comprising instructions that, when executed, cause one or more processors of a mobile communications device to perform operations comprising determining an amount of time that has elapsed since the computing device was last utilized for processing an outgoing or an incoming phone call, determining that the amount of time that has elapsed exceeds a threshold time value, and responsive to the determination, identifying a phone number to call with the computing device, establishing a voice connection using the identified phone number, and outputting a message using the voice connection.

In another example, various aspects of this disclosure are directed to a computing device comprising means for determining an amount of time that has elapsed since the computing device was last utilized for processing an outgoing or an incoming call, at least one processor, and a module operable by the at least one processor to determine that the amount of time that has elapsed since the computing device was last utilized for processing an outgoing or an incoming call exceeds a threshold time value, and responsive to the determination, identify a phone number to call with the computing device, establish a voice connection using the identified phone number, and output a message using the voice connection.

Various aspects of this disclosure may provide one or more advantages. For instance, one or more aspects of this disclosure may enable a computing device to determine that the computing device has not been utilized for an outgoing or incoming phone call for an amount of time that exceeds a threshold time value. In response, the computing device may automatically identify a phone number to call associated with a remote device, dial the phone number, and output a message upon connecting to the remote device. By automatically identifying and dialing the phone number, techniques of this disclosure may alert an individual associated with the remote device that the person associated with the device may be in trouble or may need assistance.

Techniques of this disclosure may also, in some instances, enable the computing device to automatically determine that there may be an emergency situation. In response, the computing device may identify an emergency contact phone number, establish a voice connection using the emergency contact phone number (e.g., dial the emergency contact phone number), and output an emergency message upon establishing the telephonic connection with the identified emergency contact. In this manner, techniques of this disclosure may enable a computing device to automatically notify an emergency contact of an emergency situation without requiring a user to interact with the computing device.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
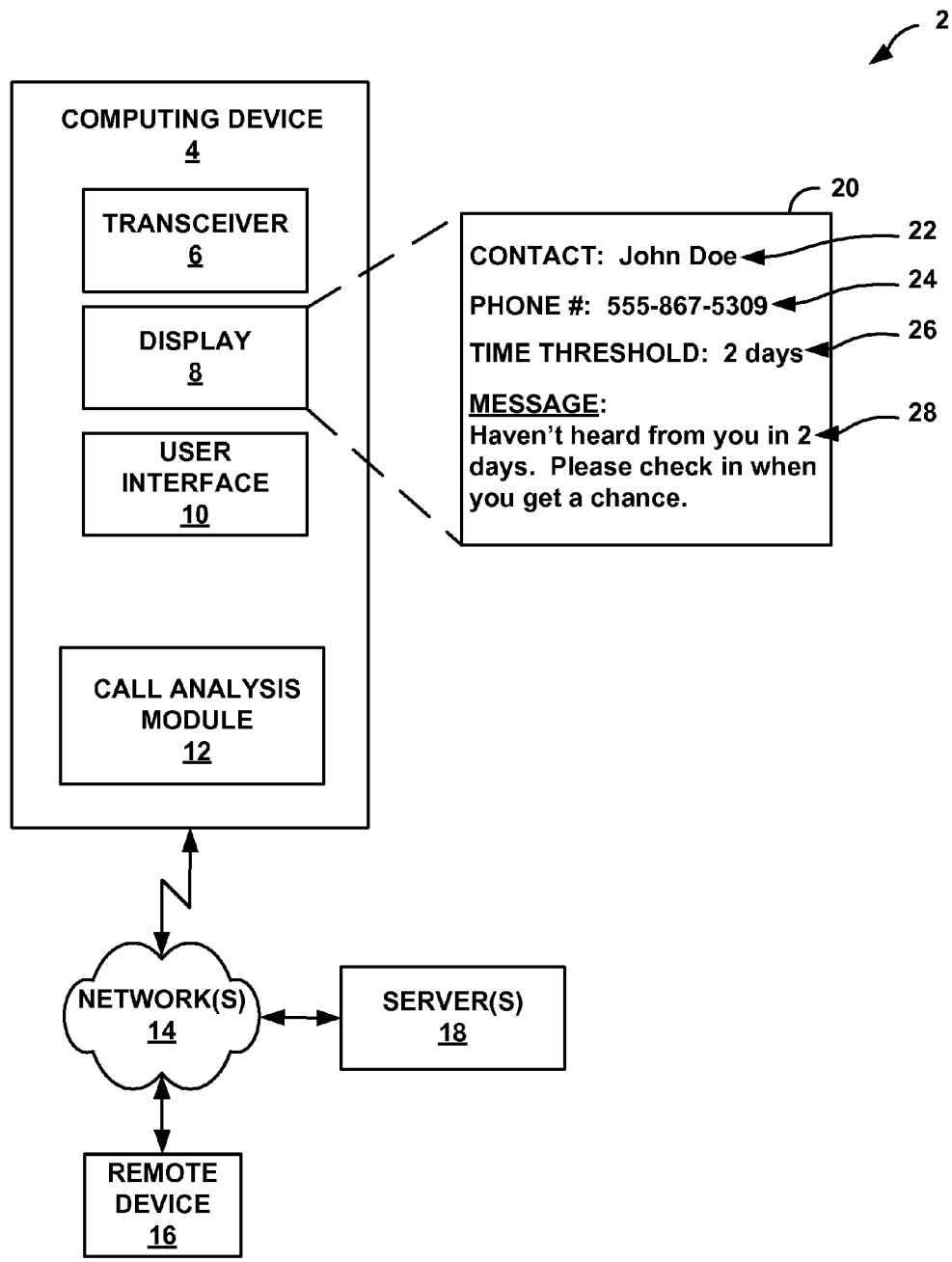
FIG. 1 is a block diagram illustrating an example communication system, in accordance with one or more aspects of this disclosure.

A computing device, such as a cellular telephone, may be used for telephonic communications. A user of the computing device may expect periodic contact with one or more other persons. For instance, a user may have a time schedule arranged with a particular person, such as a friend or relative, within which the user expects to place an outgoing phone call to or receive an incoming phone call from that person. In the case of an elderly user, for instance, the user may expect to place or receive a phone call to or from one or more other persons on a scheduled basis to establish that the user is not experiencing health or other related difficulties that require attention.

If the computing device has not been utilized for such an outgoing or incoming phone call to the particular person, it may indicate that the user of the computing device may be experiencing a health or other difficulty that may require attention. Such a difficulty may be also indicated if the computing device has not been used for any incoming or outgoing phone call within threshold amount of time (e.g., in the last two days or two weeks).

In accordance with one or more aspects of this disclosure, a computing device may determine an amount of time that has elapsed since the computing device was last utilized for processing an outgoing or an incoming phone call and determine whether the amount of time that has elapsed exceeds a threshold time value. In response to the determination that the time threshold value has been exceeded, the computing device may identify a phone number to call with the computing device, establish a voice connection using the identified phone number (e.g., dial the identified phone number to establish a voice connection), and output a message using the voice connection.

The threshold amount of time may be a predefined value or may be dynamically calculated by the computing device based on a call history of the computing device. When determining whether the threshold amount of time is exceeded, the computing device may calculate an amount of time that has elapsed since the computing device was utilized for an incoming or an outgoing phone call and compare the calculated amount of time to the threshold value. In some examples, the computing device may calculate an amount of time that has elapsed since the computing device was utilized for an incoming or an outgoing phone call to a particular phone number or a particular person (e.g., by associating one or more phone numbers stored in the computing device with a particular person).

When the computing device determines that the threshold time value is exceeded, the computing device may identify a phone number to call from a call history or phone number list (e.g., address book) stored in the computing device or may be configured to call a predefined phone number. The computing device may dial the identified phone number and, upon establishing a telephonic connection, output an audio message using the connection. The message may be a predefined message or may be generated by the computing device based on a message template stored in the computing device. The message template may include one or more placeholder portions that are replaced with content generated by the computing device based on the identified phone number such that the generated message includes a portion of the message template and the dynamically generated content associated with the identified phone number.

FIG. 1 is a block diagram illustrating an example communication system, in accordance with one or more aspects of this disclosure. As illustrated in FIG. 1, communication system 2 may include computing device 4, remote device 16, one or more servers 18, and one or more networks 14. Examples of computing device 4 and remote device 16 may include, but are not limited to, portable or mobile devices such as cellular phones, personal digital assistants (PDAs), portable gaming devices, portable media players, and e-book readers. In one example, computing device 4 and remote device 16 may be the same type of device, e.g., cellular phones. In another example, computing device 4 and remote device 16 may different types of devices, e.g., a cellular phone and a PDA.

Computing device 4 and remote device 16 are coupled to one or more networks 14 via wired or wireless links or both. The one or more networks 14 may include a telephone network such as a cellular telephone network, a wide-area network such as the Internet, a local-area network (LAN), an enterprise network, or one or more other types of networks. Computing device 4 and remote device 16 may establish voice connections or transmit and receive data using one or more networks 14.

As illustrated in FIG. 1, computing device 4 may include transceiver 6, display 8, user interface 10, and call analysis module 12. Transceiver 6 may be configured to transmit data to and receive data from remote device 16 or one or more servers 18. Transceiver 6 may be configured to establish a voice connection with remote device 16. For example, a user may initiate a telephone call with transceiver 6 to remote device 16, or receive a telephone call with transceiver 6 from remote device 16. Transceiver 6 may include hardware and software to provide wireless or wired communication. For example, transceiver 6 may include an antenna, modulator, demodulator, amplifier, or other circuitry to effectuate communication between computing device 4, remote device 16, or one or more of servers 18.

Display 8 may be a liquid crystal display (LCD), e-ink, organic light emitting diode (OLED), or other display. Display 8 may present the output of applications executing on computing device 4 to a user. For example, display 8 may present a web browser, or other functions of an application that may need to be presented to a user. In some examples, display 8 may present some or all of the functionality of user interface 10. For instance, display 8 may be a touch screen that can allow a user to interact with the mobile communications device 4.

Display 8 may present graphical user interfaces for a user of computing device 4 to view the status of one or more contact names, phone numbers, time thresholds, messages, or other information. A user may provide computing device 4 with information about one or more of the contact name, phone number, time threshold, and message, using one or more of display 8 or user interface 10. User interface 10 may allow a user of computing device 4 to interact with computing device 4. Examples of user interface 10 may include, but are not limited to, a keypad embedded on the computing device 4, a keyboard, a mouse, a roller ball, buttons, a touch screen, or other devices that allow a user to interact with computing device 4.

In the example illustrated in FIG. 1, graphical user interface 20 may provide a user of computing device 4 with information about a contact including a name (e.g., contact name 22), one or more phone numbers associated with the contact name (e.g., phone number 24), a time threshold value associated with the contact name or phone number (e.g., time threshold value 26), and a message to be output using a voice connection with the phone number (e.g., message 28.) Call analysis module 12 may determine an amount of time that has elapsed since computing device 4 was last utilized for an outgoing or an incoming phone call to a contact name (e.g., contact name 22), or a phone number (e.g., phone number 24).

Call analysis module 12 compares the determined amount of time to a threshold time value (e.g., threshold time value 26.) When call analysis module 12 determines that the determined amount of time exceeds the threshold time value, call analysis module 12 may identify a phone number to call with computing device 4 (e.g., the phone number of remote device 16). As one example, call analysis module 12 may determine a message to output over a voice connection established with remote device 16.

Figure 2:
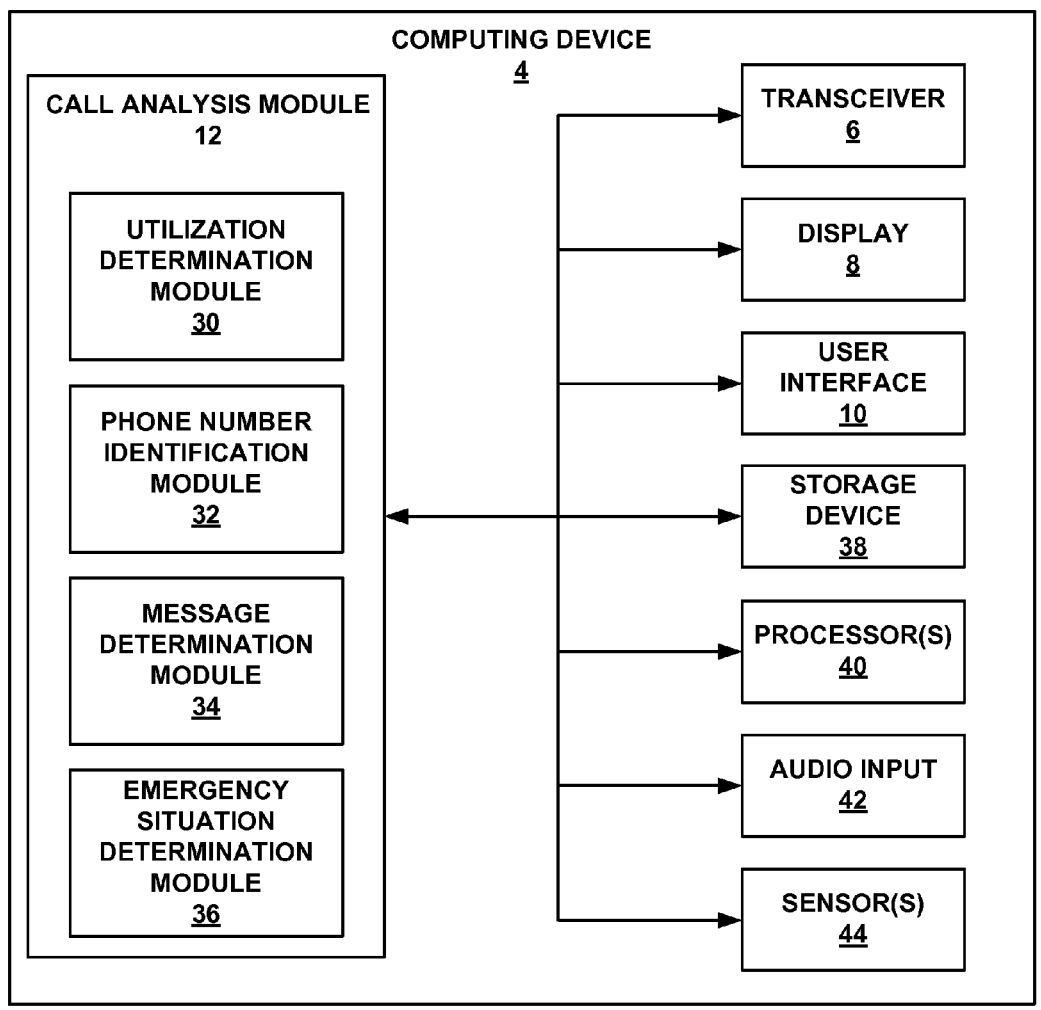
FIG. 2 is a block diagram illustrating an example computing device, in accordance with one or more aspects of this disclosure.

FIG. 2 is a block diagram illustrating an example computing device 4, in accordance with one or more aspects of this disclosure. FIG. 2 illustrates only one particular example of computing device 4, and many other example embodiments of computing device 4 may be used in other instances.

As illustrated in FIG. 2, computing device 4 may include display 8, audio input 42, one or more sensors 44, user interface 10, transceiver 6, and call analysis module 12. Call analysis module 12 may include utilization determination module 30, phone number identification module 32, message determination module 34, emergency situation determination module 36, storage device 38, and one or more processors 40.

Although shown as separate components in FIG. 2, in some examples, one or more of utilization determination module 30, phone number identification module 32, message determination module 34, and emergency situation determination module 36 may be part of the same module. In some examples, one or more of modules 6, 8, 10, and 12 may be software and/or firmware units that are executed on one or more processors 40.

Computing device 4 may include additional components not shown in FIG. 2 for clarity. For example, computing device 4 may include a battery to provide power to the components of computing device 4. Similarly, the components of computing device 4 shown in FIG. 2 may not be necessary in every example of computing device 4. For instance, if computing device 4 comprises a portable media player such as a music player, computing device 4 may not include display 8.

Storage device 38 may include any form of machine- or computer-readable media. For example, storage device 38 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Storage device 38 may, in some examples, be considered as a non-transitory storage medium. The term "non-transitory" may indicate that the storage medium is not embodied in a carrier wave or a propagated signal. However, the term "non-transitory" should not be interpreted to mean that the storage device 38 is non-movable. As one example, storage device 38 may be removed from computing device 4, and moved to another device. As another example, a storage device, substantially similar to storage device 38, may be inserted into computing device 4. In certain examples, a non-transitory storage medium may store data that can, over time, change (e.g., in RAM).

In some examples, storage device 38 may store one or more instructions that cause one or more processors 40, utilization determination module 30, phone number identification module 32, message determination module 34, and emergency situation determination module 36 to perform various functions ascribed to one or more processors 40, utilization determination module 30, phone number identification module 32, message determination module 34, and emergency situation determination module 36.

One or more processors 40 may include, in certain examples, any one or more of a microprocessor, a controller, a digital signal processor (DSP), an application specific integrated circuit (ASIC), a field-programmable gate array (FPGA), or equivalent discrete or integrated logic circuitry. Audio input 42 may be used to receive a message to be output using a voice connection in response to a determination by call analysis module 12 that the amount of time that has elapsed since the computing device was last utilized for an outgoing or incoming phone call exceeds a threshold time value. For instance, a user may speak the message "Please call Bob Jones at phone number 555-555-1234. It has been more than two days since Bob last placed or received a phone call." Audio input 42 may record the voice message spoken by the user. The voice message may be stored, such as in storage device 38 or one or more servers 18 (of FIG. 1). Computing device 4 may output the recorded message in response to a determination that the amount of time that has elapsed since the computing device was last utilized for an outgoing or incoming phone call exceeds the threshold time value of two days.

As in the example of FIG. 2, computing device 4 may include one or more sensors 44. Examples of one or more sensors 44 include, but are not limited to, accelerometers, gyroscopes, global positioning system (GPS) receivers, ambient light sensors, proximity sensors, and the like. Sensors 44 may enable computing device 4 to obtain acceleration information or location (i.e., geographic) information. Using the geographic information, computing device 4 may determine a velocity of the computing device. For instance, the geographic location information may include latitude and longitude data points obtained from the GPS at various times and compare differences in the latitude and longitude data points with respect to differences in the associated times of the data points to determine average velocity information of the computing device 4. Computing device 4 may store the obtained latitude and longitude data points and the associated times of the data points, such as in storage device 38, for later retrieval and analysis.

Computing device 4 may compare differences in the determined velocity information with respect to the differences in the associated times to determine acceleration information of computing device 4. For example, computing device 4 may determine the distance between a first geographic location data point and a second geographic location data point of the geographic location information by subtracting the latitude value associated with the first geographic location data point (Lat1) from the latitude value associated with the second geographic location data point (Lat2). Similarly, computing device 4 may subtract the longitude value associated with the first geographic location data point (Lon1) from the longitude value associated with the second geographic location data point (Lon2). Computing device 4 may determine the distance (D) between the two geographic location data points as the absolute value of the square root of the sum of the squares of the differences of the latitude values and the longitude values. For example, the distance (D) may be expressed by the following formula:

$$D = |\sqrt{(Lat2-Lat1)^2 + (Lon2-Lon1)^2}|$$

Computing device 4 may determine average velocity information of computing device 4 such as by dividing the determined distance information by the difference in the times associated with the geographic location data points. For example, computing device 4 may store a first time (t1) that the first geographic location data point (Lat1, Lon1) was received from the GPS. Similarly, computing device 4 may store a second time (t2) that the second geographic location data point (Lat2, Lon2) was received from the GPS. Computing device 4 may determine the average velocity (Vavg) of the computing device 4 between the first and second geographic location data points by dividing the distance (D) between the two geographic location data points by the difference between the first time (t1) and the second time (t2). The average velocity (Vavg) may be expressed by the following formula:

$$Vavg = \frac{\left|\sqrt{(Lat2-Lat1)^2 + (Lon2-Lon1)^2}\right|}{t2-t1}$$

Computing device 4 may determine average acceleration information of computing device 4 such as by using at least three geographic location data points and the times that the geographic location data points were received. As one example, computing device 4 may determine the average velocity between a first geographic location data point and a second geographic location data point. Similarly, computing device 4 may determine the average velocity between the second geographic location data point and a third geographic location data point. Computing device 4 may determine the average acceleration between the first geographic location data point and the third geographic location data point such as by comparing the difference of the average velocities to the difference in the times associated with the first and third geographic location data points. In such an example, the average acceleration (Aavg) may be expressed by the following formula:

$$Aavg = \frac{\left|\frac{\sqrt{(Lat3 - Lat2)^2 + (Lon3 - Lon2)^2}}{(t3 - t2)}\right| - \left|\frac{\sqrt{(Lat2 - Lat1)^2 + (Lon2 - Lon1)^2}}{(t2 - t1)}\right|}{t3 - t1}$$

Computing device 4 may determine an amount of time that has elapsed since the computing device 4 was last utilized for an outgoing or an incoming phone call, such as by using utilization determination module 30. Utilization determination module 30 may determine the amount of time that has elapsed since computing device 4 was last utilized for an incoming phone call (e.g., a phone call received by computing device 4), an outgoing phone call (e.g., a phone call placed by computing device 4), or both.

Utilization determination module 30 may determine the amount of time that has elapsed since computing device 4 was last utilized for an incoming or outgoing phone call with a phone number. For instance, utilization determination module 30 may determine the amount of time that has elapsed since computing device 4 was last utilized for an incoming or outgoing phone call with the phone number "555-867-5309."

Utilization determination module 30 may determine the amount of time that has elapsed since computing device 4 was last utilized for an incoming or outgoing phone call with a contact listed in a contacts list associated with computing device 4. One or more phone numbers may be associated with the contact. Computing device 4 may determine the amount of time that has elapsed since computing device 4 was used for an incoming or outgoing phone call with each of the one or more phone numbers and may identify the smallest amount of elapsed time as the amount of time that has elapsed since computing device 4 was used for an incoming or outgoing phone call with the contact.

Computing device 4 may determine that the amount of time that has elapsed since computing device 4 was last utilized for an incoming or outgoing phone call exceeds a threshold time value. In some examples, the threshold time value may be the same with respect to both incoming and outgoing phone calls. In other examples, the threshold time value may be different for incoming phone calls than for outgoing phone calls. For instance, computing device 4 may compare the amount of time that has elapsed since computing device 4 was last utilized for processing either an incoming or outgoing phone call to a threshold time value. As another example, computing device 4 may compare the amount of time that has elapsed since computing device 4 was last utilized for processing an incoming phone call to one threshold time value, and may compare the amount of time that has elapsed since computing device 4 was last utilized for processing an outgoing phone call to a different threshold time value.

The threshold time value may be predefined, such as by a user of computing device 4 (e.g., using user interface 10, display 8, or both). In some examples, the predefined threshold time value may be a default threshold time value of computing device 4. For instance, computing device 4 may predetermine the threshold time value to be a value of two days unless the value is changed.

Computing device 4 may dynamically determine the threshold time value. For example, computing device 4 may analyze a call history stored in a call log associated with computing device 4 to determine the threshold time value. In such an example, computing device 4 may dynamically determine the threshold time value, such as by determining the average amount of time that has elapsed between times that computing device 4 has been utilized for incoming or outgoing phone calls. For instance, computing device 4 may determine the average amount of time that has elapsed between utilizations of computing device 4 for incoming or outgoing phone calls over the past day, week, month, or other period of time. If, for example, the average amount of time that has elapsed between such utilizations is four hours, computing device 4 may determine the threshold time value to be twelve hours. If, however, the average amount of time that has elapsed between such utilization is two days, for example, computing device 4 may determine the threshold time value to be three days.

The threshold time value (e.g., the predefined or dynamically determined threshold time value) may be in respect of the total amount of time that has elapsed since computing device 4 was last utilized for an incoming or outgoing phone call. For instance, the threshold time value may be two days. Utilization determination module 30 may determine that the threshold time value has been exceeded if the amount of time that has elapsed since computing device 4 was last utilized for any call (e.g., an incoming phone call or an outgoing phone call) exceeds two days.

The threshold time value may be in respect to an identified phone number. For instance, the identified phone number may be "555-867-5309." Utilization determination module 30 may determine that the threshold time value has been exceeded if the amount of time that has elapsed since computing device 4 was last utilized for an incoming or outgoing phone call to the identified phone number "555-867-5309" exceeds the threshold time value.

The threshold time value may be in respect to an identified contact. For example, one or more phone numbers may be associated with a contact, such as in a list stored in storage device 38 or one or more servers 18 (of FIG. 1). Utilization determination module 30 may determine that the threshold time value has been exceeded if the minimum amount of time that has elapsed since computing device 4 was last utilized for an incoming or outgoing phone call with the contact exceeds the threshold time value.

Computing device 4 may use a calendar associated with computing device 4 to determine the threshold time value. For instance, a calendar associated with computing device 4 may indicate that a user of computing device 4 will be on vacation for a period of time. In such an example, computing device 4 may determine that the user may not place or receive normally scheduled phone calls while on vacation, and may therefore determine that the threshold time value may not be exceeded during the time that the user of computing device 4 is indicated to be on vacation. As an example, the calendar associated with computing device 4 may indicate that an identified contact will be unavailable for a period of time. Computing device 4 may determine that the threshold time value may not be exceeded due to an absence of phone calls to or from the identified contact during the period of time that the contact is indicated to be unavailable.

Computing device 4 may determine the threshold time based on the estimated remaining battery charge of a battery of computing device 4. For instance, computing device 4 may estimate that battery of computing device 4 has a remaining charge sufficient to power the components of computing device 4 for one hour. Computing device 4 may determine that a message should be sent before the battery loses its charge. Computing device 4 may dynamically change a threshold value such that the threshold value will be exceeded before the estimated time that the battery will lose its charge.

Computing device 4 may determine that the amount of time that has elapsed since computing device 4 was last utilized for an outgoing or incoming phone call exceeds the threshold value, and may identify a phone number to call. In some examples, phone number identification module 32 may identify the phone number to call as one of a predefined list of one or more phone numbers. For instance, a user may predefine one or more phone numbers to call, such as by using one or more of user interface 10 and display 8. The predefined list of one or more phone numbers may be stored in computing device 4 (e.g., in storage device 28), or in a location remote from computing device 4 that computing device 4 can access (e.g., one or more servers 18 of FIG. 1). As one example, computing device 4 may dial all of the phone numbers in the predefined list of phone numbers. As another example, computing device 4 may dial the phone numbers in the predefined list until a voice connection is established.

In certain examples, phone number identification module 32 may identify the phone number to call with computing device 4 by identifying a contact listed in a contacts list associated with computing device 4 and identifying one or more phone numbers associated with the contact. For instance, a user of computing device 4 may predefine a contact to call in response to a determination that the amount of time that has elapsed since computing device 4 was last utilized for an outgoing or an incoming phone call exceeds a threshold time value. Phone number identification module 32 may identify one or more phone numbers associated with the contact, such as by analyzing a contacts list associated with computing device 4. Phone number identification module 32 may identify the phone number to call as one of the phone numbers in the list of one or more phone numbers associated with the contact. As one example, computing device 4 may dial each of the one or more phone numbers associated with the contact. As another example, computing device 4 may dial the one or more phone numbers associated with the contact until a voice connection is established.

Phone number identification module 32 may identify a phone number to call with computing device 4 using a calendar associated with computing device 4. A calendar of computing device 4 may indicate, for example, that a user of computing device 4 will be in a particular geographic location at a particular time. Phone number identification module 32 may identify an area code associated with that geographic location, such as by using a database of area codes and associated geographic locations. Phone number identification module 32 may analyze a contacts list associated with computing device 4, may determine that there is at least one phone number in the contacts list that includes an area code that matches the area code of the geographic location indicated on the calendar, and may identify the phone number to call as one of the at least one phone numbers that include the matching area code.

Phone number identification module 32 may identify a phone number to call with computing device 4 using a GPS (e.g., one or more sensors 44) of computing device 4. For example, phone number identification module 32 may determine a geographic location of computing device 4 by obtaining geographic location information from the GPS of computing device 4. Phone number identification module 32 may determine an area code associated with the determined geographic location, such as by using a database of area codes and associated geographic locations. Phone number identification module 32 may analyze a contacts list associated with computing device 4, may determine that there is at least one phone number in the contacts list that includes an area code that matches the area code of the geographic location indicated on the calendar, and may identify the phone number to call as one of the at least one phone numbers that include the matching area code.

Phone number identification module 32 may identify a phone number to call with computing device 4, such as by analyzing a call history stored in a call log associated with computing device 4. For instance, phone number identification module 32 may identify the phone number to call as the phone number that occurs most frequently in the call history. As one example, phone number identification module 32 may analyze the call history to determine a contact that occurs most frequently in the call history. Phone number identification module 32 may identify the phone number to call as one of a set of phone numbers associated with the contact.

Upon identifying the phone number, computing device 4 may establish a voice connection using the identified phone number. As one example, establishing the voice connection may include dialing the identified phone number to establish a voice connection. Computing device 4 may output a message using the established voice connection. Message determination module 34 may determine the message to be output by computing device 4. As one example, message determination module 34 may determine that the message to be output is a predefined message. For instance, a user of computing device 4 may predefine the message "Please call John Doe at 555-555-1234. John has not sent or received a phone call in 2 days." In some examples, the predefined message may be a prerecorded audio message, such as by using audio input 42 of computing device 4. In certain examples, the message may be provided as a textual message. For instance, computing device 4 may output the message as a voice message (e.g., using the established voice connection) such as by using text-to-speech algorithms. Different predefined messages may be provided corresponding to different phone numbers, corresponding to different identified contacts, or both.

Message determination module 34 may dynamically generate the output message based on the geographic location of computing device 4. For example, message determination module 34 may obtain geographic location information from a GPS of computing device 4, and message determination module 34 may determine that computing device 4 is at a location associated with the home of a user of computing device 4. Message determination module 34 may dynamically generate the content of the output message based on the geographic location. For instance, message determination module 34 may generate the message "Please call John Doe. John's cellular phone is at his home and has not sent or received a phone call in 2 days."

Message determination module 34 may dynamically generate the output message based on the identified phone number that was dialed by computing device 4 to establish the voice connection. For instance, the identified phone number may be associated with a contact in a list of contacts stored on computing device 4 or one or more servers 18. Message determination module 34 may dynamically generate the content of the output message to include the name of the contact associated with the identified phone number. Message determination module 34 may dynamically generate the output message based on the geographic location of computing device 4 and the identified phone number that was dialed to establish the voice connection. For example, message determination module 34 may include within the content of the message, the location of computing device 4, and the name of a contact associated with the identified phone number.

Message determination module 34 may generate the message based on a message template. For example, a message template could be defined by a user, such as by entering or modifying a textual template using a user interface of computing device 4 (e.g., user interface 10). In some examples, the message template may include a default portion and a placeholder portion. For instance, a message template may include the message template "Hello NAME, please call John Doe. John has not sent or received a phone call in TIME." In the previous example, the upper case "NAME" and "TIME" may be placeholder portions, while the remainder of the message may be default portions.

Message determination module 34 may generate the message by replacing the placeholder portion with the generated content. For instance, message determination module 34 may generate the content to replace the "NAME" placeholder, such as by analyzing a contacts list associated with computing device 4 and identifying a name of a user in the contacts list associated with the identified phone number. Message determination module 34 may replace the "NAME" placeholder with the generated content representing the name of the user associated with the identified phone number. Similarly, message determination module 34 may replace the "TIME" placeholder with generated content representing the amount of time that has elapsed since computing device 4 has been utilized for incoming or outgoing communications. In certain examples, message determination module 34 may generate the message as a textual message and may use text-to-speech algorithms to output the generated textual message using the established voice connection.

Computing device 4 may determine that there is an emergency situation, such as by using emergency situation determination module 36. In some examples, emergency situation determination module 36 may determine that there is an emergency situation when acceleration information exceeds a threshold acceleration value. In other words, when computing device 4 determines that there was an abrupt acceleration or deceleration event, computing device 4 may determine that there is an emergency situation. For example, if a user is involved in a traffic accident, computing device 4 may determine that the acceleration information exceeds the threshold acceleration value and, therefore, there is an emergency situation. Emergency situation determination module 36 may obtain the acceleration information from an accelerometer (e.g., one or more sensors 44) of computing device 4 or may generate acceleration information using geographic location information obtained from a GPS (e.g., one or more sensors 44).

Emergency situation determination module 36 may determine that there is an emergency situation using both velocity and acceleration information of computing device 4. For example, emergency situation determination module 36 may determine that there is an emergency situation when the velocity information of computing device 4 exceeds a threshold velocity value and the acceleration information of computing device 4 exceeds a threshold acceleration value. For instance, emergency situation determination module 36 may determine that a velocity of greater than forty miles per hour followed by a deceleration greater than thirty Gs (e.g., thirty times the acceleration due to gravity) may indicate that computing device 4 has been involved in an accident, such as an automobile accident. As such, emergency situation determination module 36 may determine that there is an emergency situation.

Emergency situation determination module 36 may obtain or determine the geographic information, velocity information, and acceleration information from one or more of sensors 44. For example, emergency situation module 36 may obtain geographic location information from a GPS of computing device 4 and determine one or more of velocity and acceleration information of the computing device using the geographic location information. As another example, emergency situation determination module 36 may obtain geographic location information from a GPS of computing device 4, determine velocity information of computing device 4 using the geographic location information, and obtain acceleration information from an accelerometer of computing device 4.

As one example, computing device 4 may determine a geographic location of computing device 4 (e.g., using geographic location information obtained from a GPS of computing device 4), and may determine a second amount of time that has elapsed since computing device 4 was last physically moved. In such an example, emergency situation determination module 36 may determine that there is an emergency situation based on the amount of time since the computing device was last utilized for an outgoing or an incoming phone call, the geographic location of computing device 4, and the second amount of time that has elapsed since computing device 4 was last physically moved. For instance, emergency situation determination module 36 may determine that there is an emergency situation if computing device 4 is in a rural geographic location, has not been moved for a first threshold amount of time, and has not been used for an incoming or outgoing communication for a second threshold amount of time.

When emergency situation determination module 36 determines that there is an emergency situation, computing device 4 may identify an emergency contact phone number (e.g., using phone number identification module 32), establish a voice connection using the identified emergency contact phone number (e.g., dial the emergency contact phone number using one or more processors 40 and transceiver 6), and output an emergency message using the voice connection (e.g., using message determination module 34). The emergency contact phone number may be a predefined emergency contact phone number. For instance, a user of computing device 4 may predefine an emergency contact phone to be dialed when computing device 4 determines there is an emergency situation. In certain examples, the emergency contact phone number may be a standard emergency contact phone number, such as "911."

Call analysis module 12 (e.g., one or more of utilization determination module 30, phone number identification module 32, message determination module 34, or emergency situation determination module 36) may modify the future performance of one or more aspects of call analysis module 12 based on feedback received from a user or feedback determined by computing device 4. For example, when identifying a phone number to call with the computing device, phone number identification module 32 may associate a higher priority with those phone numbers that have been successfully used to establish a voice connection in the past. In such a way, phone number identification module 32 may increase the likelihood that communication attempts will result in an established voice connection.

As another example, computing device 4 may attempt to decrease the amount of time that is likely to elapse between the time when computing device 4 outputs a message and the time when computing device 4 is utilized for processing an incoming phone call. For instance, it may take varying amounts of time for people to respond after receiving a message indicating that computing device 4 has not been used for processing an incoming or outgoing phone call for a threshold amount of time. Utilization determination module 30 may determine the amount of time that has elapsed between the time when computing device 4 outputs a message using a voice connection established with a particular phone number and a time when computing device 4 is utilized for processing an incoming phone call. Phone number identification module 32 may assign a higher priority to phone numbers that result in a quicker response, and may identify higher priority phone numbers for future communications.

Call analysis module 12 may prompt a user to provide feedback (e.g., using user interface 10), and may modify its performance of one or more aspects based on the received feedback. For instance, emergency situation determination module 36 may determine that there is an emergency situation after a sudden deceleration event (e.g., when acceleration information obtained from an accelerometer of computing device 4 exceeds a threshold acceleration value). Emergency situation determination module 36 may prompt a user for feedback regarding whether the situation truly was an emergency. In response to feedback from the user that there was no emergency, emergency situation determination module 36 may increase the threshold acceleration value. In such a way, emergency situation determination module 36 may decrease the likelihood of falsely determining that there is an emergency situation in the future.

Figure 3:
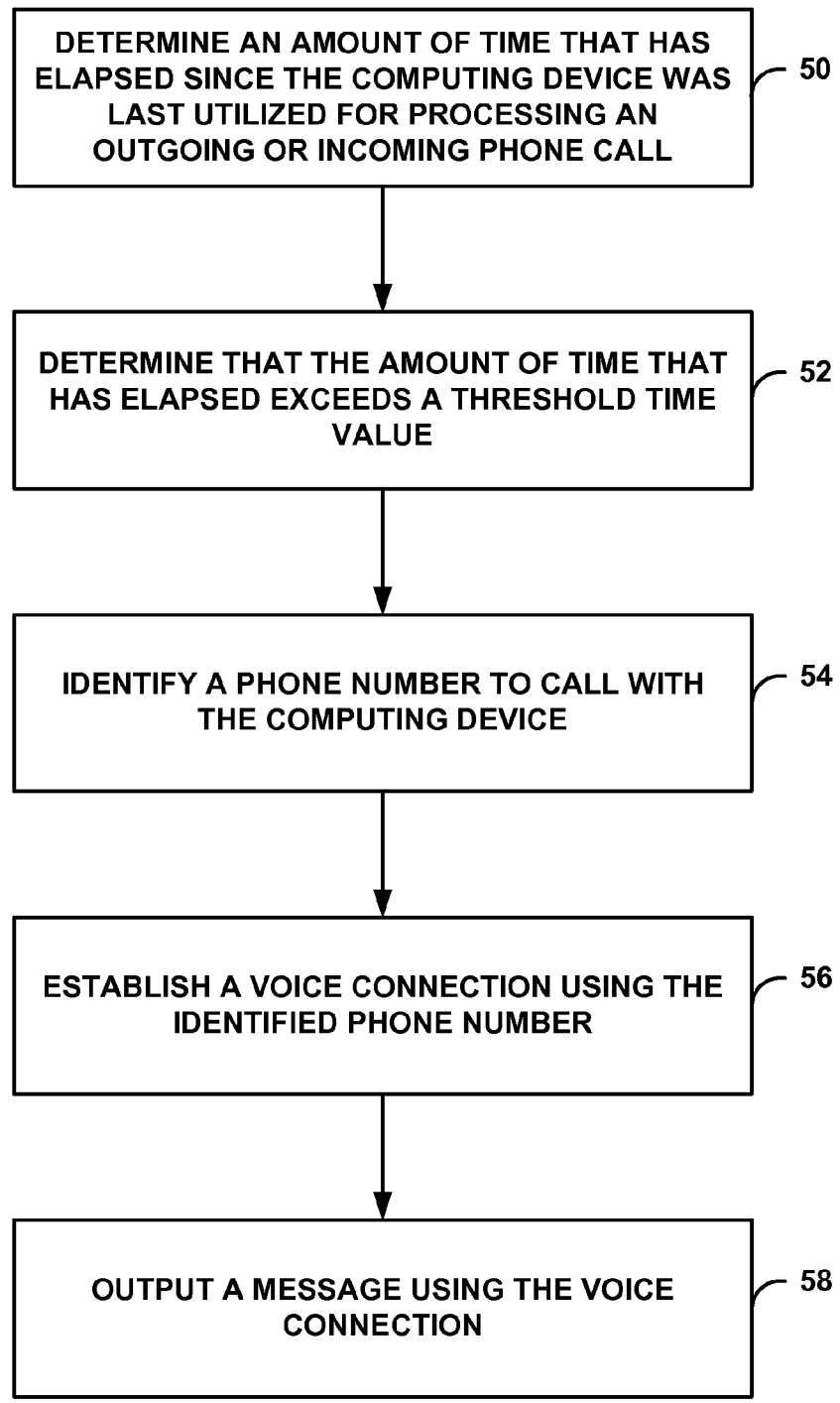
FIG. 3 is a flow diagram illustrating an example method of a computing device, in accordance with one or more aspects of this disclosure.

FIG. 3 is a flow diagram illustrating an example method of a computing device, in accordance with one or more aspects of this disclosure. For purposes of illustration only, the example method is described below within the context of computing device 4 of FIG. 2. Computing device 4 may determine an amount of time that has elapsed since the computing device was last utilized for processing an outgoing or incoming phone call (50) (e.g., by utilization determination module 30). Computing device 4 may determine that the amount of time that has elapsed exceeds a threshold time value (52) (e.g., by utilization determination module 30). Computing device 4 may identify a phone number to call with the computing device (54) (e.g., by phone number identification module 32).

Identifying the phone number to call with the computing device may include analyzing a call history stored in a call log associated with the computing device (e.g., a call log stored in storage device 38 or one or more servers 18 of FIG. 1), such as by identifying the phone number that occurs most frequently in the call history. Computing device 4 may determine a geographic location of the computing device, such as by using one or more of geographic location information obtained from a GPS of the computing device or an indication of geographic location obtained from a calendar associated with the computing device. In some examples, identifying the phone number to call with the computing device may include identifying the phone number based on the geographic location (e.g., by phone number identification module 32).

Computing device 4 may identify a user of a second device (e.g., using a list of contacts associated with the computing device). Identifying the phone number to call with the computing device may include, in certain examples, identifying one of a set of phone numbers associated with the user of the second device. For instance, identifying the user of the second device may include analyzing a call history stored in a call log associated with the computing device and identifying the user that occurs most frequently in the call history.

Computing device 4 may establish a voice connection using the identified phone number (56) (e.g., by one or more processors 40 and transceiver 6). For instance, establishing the voice connection may include dialing the identified phone number. Computing device 4 may output a message using the voice connection (58) (e.g., by message determination module 34).

In certain examples, computing device 4 may determine a geographic location of the computing device. In such examples, computing device 4 may dynamically generate the message based on the geographic location of the computing device. Dynamically generating the message may include dynamically generating the message based on the identified phone number to call with the computing device and the geographic location of the computing device.

Computing device 4 may generate the message to be output using the established voice connection based on a message template (e.g., by message determination module 34). For example, the message template may include a default portion and a placeholder portion. Generating the message to be output based on the message template may include generating content to include in the message based on the identified phone number and replacing the placeholder portion of the message template with the generated content.

Figure 4:
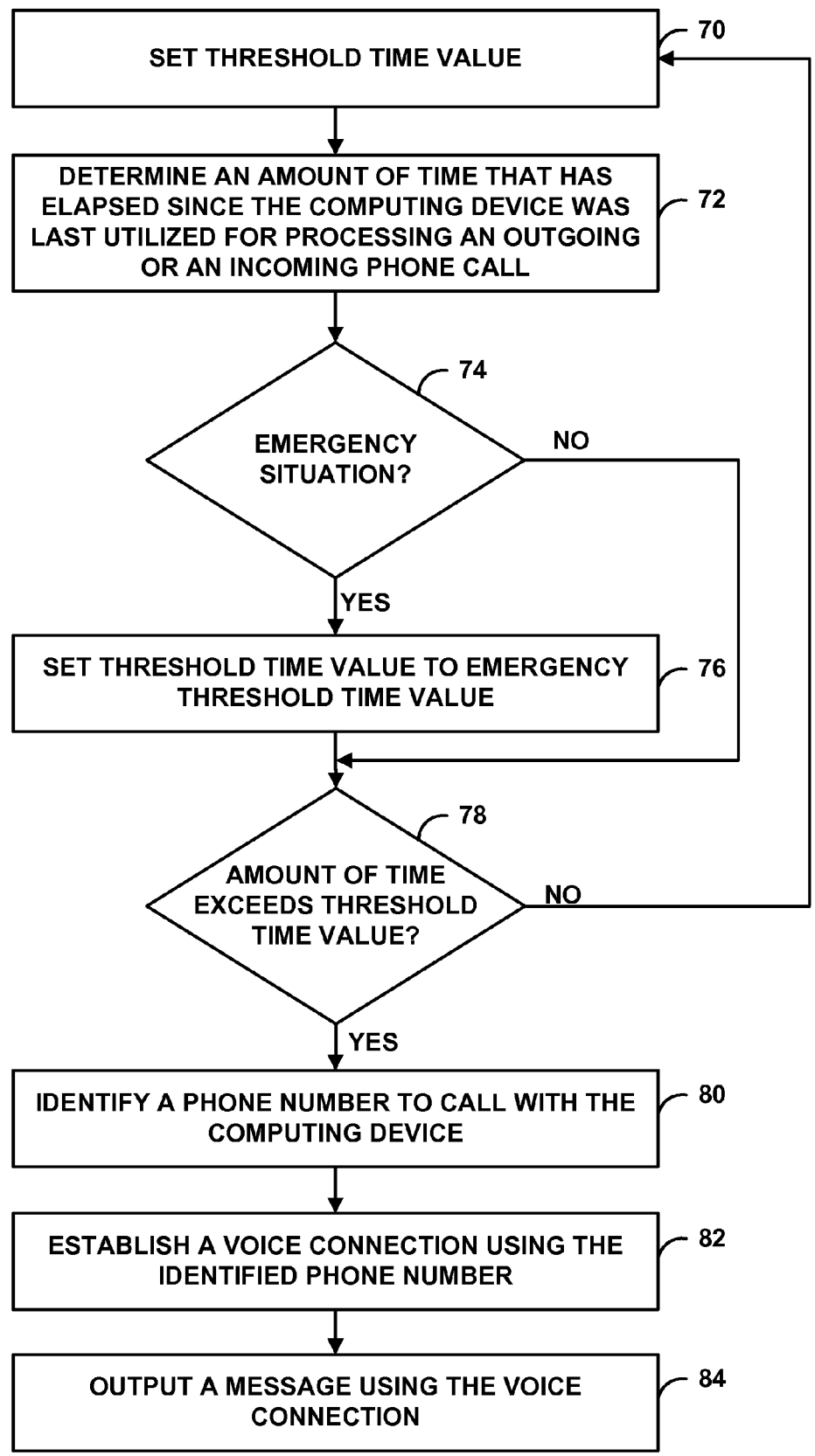
FIG. 4 is a flow diagram illustrating an example method of a computing device, in accordance with one or more aspects of this disclosure.

FIG. 4 is a flow diagram illustrating an example method of a computing device, in accordance with one or more aspects of this disclosure. For purposes of illustration only, the example method is described below within the context of computing device 4 of FIG. 2. Computing device 4 may set a threshold time value (70). Computing device 4 may determine an amount of time that has elapsed since the computing device was last utilized for processing an outgoing or an incoming phone (72) (e.g., by utilization determination module 30). Computing device 4 may determine whether there is an emergency situation (74) (e.g., by emergency situation determination module 36).

A geographic location of the computing device may be determined (e.g., using geographic location information obtained from a GPS of the computing device), and a second amount of time that has elapsed since the computing device was last physically moved may be determined. Determining that there is an emergency situation may include determining that there is an emergency situation based on the amount of time that has elapsed since the computing device was last utilized for an outgoing or an incoming phone call, the geographic location of the computing device, and the second amount of time that has elapsed since the computing device was last physically moved.

Computing device 4 may obtain acceleration information from an accelerometer of the computing device. Determining that there is an emergency situation may include determining that there is an emergency situation when the acceleration information exceeds a threshold acceleration value (e.g., by emergency situation determination module 36).

As an example, computing device 4 may obtain geographic location information from a GPS of the computing device. In such an example, computing device 4 may determine acceleration information using the geographic location information, and may determine that there is an emergency situation when the acceleration information determined using the geographic location information exceeds a threshold acceleration value.

In certain examples, computing device 4 may obtain acceleration information from an accelerometer of the computing device and may obtain geographic location information from a GPS of the computing device. In such examples, computing device 4 may determine velocity information of the computing device using the geographic location information. Determining that there is an emergency situation may include determining that there is an emergency situation when the acceleration information obtained from the accelerometer exceeds a threshold acceleration value and when the velocity information determined using the geographic location information exceeds a threshold velocity value.

If it is determined that there is an emergency situation ("YES" branch of 74), computing device 4 may set the threshold time value to an emergency threshold time value. For example, the emergency threshold time value may be shorter than a predefined or dynamically generated threshold time value in non-emergency situations. For instance, a user of the computing device may predefine a threshold time value of 2 days. However, upon determination that there is an emergency situation, the computing device may set the threshold time value to a shorter emergency threshold time value. If, however, it is determined that there is no emergency situation ("NO" branch of 74), computing device 4 may allow the threshold time value to may remain the same, and may not set the threshold time value to an emergency threshold time value.

Computing device 4 may determine whether the amount of time that has elapsed since the computing device was last utilized for processing an outgoing or an incoming phone call exceeds the threshold time value (78) (e.g., by utilization determination module 30). If it is determined that the amount of time that has elapsed does not exceed the threshold time value ("NO" branch of 78), computing device 4 may set the threshold time value to the original threshold time value.

If, however, it is determined that the amount of time that has elapsed exceeds the threshold time value ("YES" branch of 78), computing device 4 may identify a phone number to call with the computing device (80) (e.g., by phone number identification module 32). For instance, if it is determined that there is an emergency situation, identifying the phone number to call with the computing device may include identifying an emergency contact phone number.

Computing device 4 may establish a voice connection using the identified phone number (82). For example, computing device 4 may establish the voice connection by dialing the identified phone number. Computing device 4 may output a message using the established voice connection (84) (e.g., by message determination module 34).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   determining, with a computing device, an amount of time that has elapsed since the computing device was last utilized for processing an outgoing or an incoming phone call;
   determining, with the computing device, that the amount of time that has elapsed exceeds a threshold time value; and
   responsive to the determination,
      identifying, with the computing device, a phone number to call with the computing device,
      establishing, with the computing device, a voice connection using the identified phone number, and
      outputting a message using the voice connection.

2. The method of claim 1, wherein identifying the phone number further comprises:
   analyzing a call history stored in a call log associated with the computing device; and
   identifying the phone number based on a number that occurs most frequently in the call history.

3. The method of claim 1, further comprising:
   determining, with the computing device, a geographic location of the computing device, wherein identifying the phone number to call comprises identifying the phone number based on the geographic location.

4. The method of claim 3, further comprising:
dynamically generating the message based on the geographic location of the computing device.

5. The method of claim 1, further comprising:
identifying, with the computing device, a second phone number,
wherein determining the amount of time that has elapsed since the computing device was last utilized for processing an outgoing or an incoming phone call comprises analyzing a call history stored in a call log associated with the computing device to determine the amount of time that has elapsed since the computing device was last utilized for an outgoing or an incoming phone call with the second identified phone number.

6. The method of claim 1, further comprising:
determining, with the computing device, a geographic location of the computing device; and
dynamically generating the message based on the geographic location.

7. The method of claim 6, wherein dynamically generating the message comprises dynamically generating the message based on the geographic location and the identified phone number.

8. The method of claim 1, further comprising:
determining, with the computing device, a charge level of a battery of the computing device; and
establishing the voice connection using the identified phone number when the charge level is determined to be lower than a threshold charge level.

9. The method of claim 1, further comprising:
determining, with the computing device, that there is an emergency situation,
wherein establishing the voice connection using the identified phone number comprises establishing the voice connection using an emergency contact phone number upon determining that there is an emergency situation, and
wherein outputting the message comprises outputting an emergency message.

10. The method of claim 9, further comprising:
determining, with the computing device, a geographic location of the computing device; and
determining, with the computing device, a second amount of time that has elapsed since the computing device was last physically moved,
wherein determining that there is the emergency situation comprises determining that there is the emergency situation based on the amount of time that has elapsed since the computing device was last utilized for an outgoing or an incoming phone call, the geographic location of the computing device, and the second amount of time that has elapsed since the computing device was last physically moved.

11. The method of claim 9, further comprising:
obtaining acceleration information from an accelerometer of the computing device,
wherein determining that there is the emergency situation comprises determining that there is the emergency situation when the acceleration information exceeds a threshold acceleration value.

12. The method of claim 9, further comprising:
obtaining geographic location information from a global positioning system (GPS) of the computing device; and
determining acceleration information of the computing device based on the geographic location information,
wherein determining that there is the emergency situation comprises determining that there is the emergency situation when the acceleration information determined using the geographic location information exceeds a threshold acceleration value.

13. The method of claim 9, further comprising:
obtaining acceleration information from an accelerometer of the computing device;
obtaining geographic location information from a global positioning system (GPS) of the computing device; and
determining velocity information of the computing device based on the geographic location information,
wherein determining that there is the emergency situation comprises determining that there is the emergency situation when the acceleration information obtained from the accelerometer exceeds a threshold acceleration value and when the velocity information determined using the geographic location information exceeds a threshold velocity value.

14. The method of claim 1, further comprising:
generating, with the computing device, the message based on a message template.

15. The method of claim 14, further comprising:
generating, with the computing device, content to include in the message based on the identified phone number, wherein the message template includes a default portion and a placeholder portion, and wherein the computing device generates the message by replacing the placeholder portion with the generated content.

16. The method of claim 1, further comprising:
identifying, with the computing device, a user of a second device,
wherein identifying the phone number to call with the computing device comprises identifying one of a set of phone numbers associated with the user of the second device.

17. The method of claim 16, wherein identifying the user of the second device comprises identifying the user of the second device using a list of contacts associated with the computing device.

18. The method of claim 16, wherein identifying the user of the second device comprises:
analyzing a call history stored in a call log associated with the computing device; and
identifying the user based on a username that occurs most frequently in the call history.

19. A non-transitory computer-readable storage medium comprising instructions that, when executed, cause one or more processors of a computing device to perform operations comprising:
determining an amount of time that has elapsed since the computing device was last utilized for processing an outgoing or an incoming phone call;
determining that the amount of time that has elapsed exceeds a threshold time value; and responsive to the determination,
identifying a phone number to call with the computing device,
establishing a voice connection using the identified phone number, and
outputting a message using the voice connection.

20. A computing device, comprising:
means for determining an amount of time that has elapsed since the computing device was last utilized for processing an outgoing or an incoming call;

at least one processor;
a module operable by the at least one processor to:
- determine that the amount of time that has elapsed since the computing device was last utilized for processing an outgoing or an incoming call exceeds a threshold time value; and
- responsive to the determination,
  - identify a phone number to call with the computing device,
  - establish a voice connection using the identified phone number, and
  - output a message using the voice connection.

* * * * *